(12) United States Patent
Mashio et al.

(10) Patent No.: US 6,199,622 B1
(45) Date of Patent: Mar. 13, 2001

(54) CONNECTING STRUCTURE FOR CONNECTING RADIATOR AND CONDENSER

(75) Inventors: Katsuji Mashio; Fumihiro Inoue; Yukinobu Take; Hiroshi Koizumi; Katsumi Nakamura; Hironori Muramoto, all of Tokyo (JP)

(73) Assignee: Calsonic Kansei Corporation, Tokyo (JP)

( * ) Notice: Subject to any disclaimer, the term of this patent is extended or adjusted under 35 U.S.C. 154(b) by 0 days.

(21) Appl. No.: 09/362,962

(22) Filed: Jul. 30, 1999

(30) Foreign Application Priority Data

Jul. 30, 1998 (JP) .................................................. 10-215089

(51) Int. Cl.[7] ................................ F28F 9/00; F28D 1/00; B60K 11/04
(52) U.S. Cl. .............................. 165/67; 165/68; 165/149; 180/68.4
(58) Field of Search ............................... 165/67, 68, 149; 180/68.4; 248/209, 213.3, 213.4, 232

(56) References Cited

U.S. PATENT DOCUMENTS

| | | | |
|---|---|---|---|
| 4,306,615 | * 12/1981 | Bolton et al. | 165/67 |
| 5,139,080 | * 8/1992 | Bolton et al. | 165/67 |
| 5,269,367 | * 12/1993 | Susa et al. | 180/68.4 |
| 5,429,181 | * 7/1995 | Tordjeman | 165/67 |
| 5,535,819 | * 7/1996 | Matsuura | 165/67 |

FOREIGN PATENT DOCUMENTS

| | | |
|---|---|---|
| 59-130987 | 9/1984 | (JP) . |
| 1151587 | * 9/1997 | (JP) . |

* cited by examiner

*Primary Examiner*—Ira S. Lazarus
*Assistant Examiner*—Tho Duong
(74) *Attorney, Agent, or Firm*—Foley & Lardner

(57) ABSTRACT

A connecting structure for connecting a radiator having a reinforcement member and a condenser having a bracket is provided. The structure includes a connecting member having a spacer portion and a holding portion integrally formed on opposite sides of a notch. The spacer portion is fittingly inserted into the reinforcement member, and a folded portion of the reinforcement member and the condenser bracket are inserted into the notch. A bolt is inserted through the reinforcement member, the spacer portion, the bracket and the holding portion and a nut is screwed onto a tip of the bolt for clamping the radiator and the condenser together.

25 Claims, 6 Drawing Sheets

PRIOR ART

CONNECTING STRUCTURE FOR CONNECTING RADIATOR AND CONDENSER

BACKGROUND OF THE INVENTION

1. Field of the Invention

The present invention relates to a connecting structure for connecting a radiator and condenser.

The present application is based on Japanese Patent Application No. Hei. 10-215089, which is incorporated herein by reference.

2. Description of the Related Art

A conventionally known connecting structure for connecting a radiator and a condenser is described in Japanese Utility Model Publication No. Sho. 59-130987.

FIG. 12 shows a connecting structure disclosed in the publication, and in this connecting structure, a condenser 1 and a radiator 2 are arranged at a predetermined interval.

In addition, a spacer 5 is disposed between a cooling air guide 3 of the condenser 1 and a reinforce 4 of the radiator 2, and a bolt 6 is put through them. A nut 7 is then screwed onto a tip of the bolt, whereby the condenser 1 and the radiator 2 are connected to each other.

With the aforesaid conventional connecting structure for connecting a radiator and a condenser, however, since the condenser 1 is connected only to a folded portion 4a formed on one side of the reinforce 4 of the radiator 2 via the spacer 5, there is caused a risk of the folded portion 4a being deformed, thus leading to a problem that a sufficient connecting strength cannot be obtained.

SUMMARY OF THE INVENTION

The present invention was made to solve the above problem, and an object thereof is to provide a connecting structure for connecting a radiator and a condenser in which a condenser can be connected to a reinforce of a radiator easily and securely.

According to the present invention, there is provided a connecting structure for connecting a radiator and a condenser by connecting a bracket fixed to a tank of the condenser with a reinforce having a U-shaped cross-section and disposed on both sides of a core of the radiator by a connecting member. A notch is formed in the connecting member, a spacer portion is integrally formed on one side of the notch, and a supportingly holding portion is integrally formed on the other side of the notch. The spacer portion is fittingly inserted into the reinforce and a folded portion of the reinforce situated on the side thereof facing the condenser and the bracket are fittingly inserted into the notch. A bolt is put through the reinforce, the spacer portion, the bracket and the supportingly holding portion, and a nut is screwed onto a tip of the bolt for clamping the radiator and the condenser together.

In the connecting member, a recessed portion may be formed on the supportingly holding portion, and the bracket is fittingly inserted into a recessed portion formed on the supportingly holding portion.

Preferably, a nut receiving portion for receiving the nut in such a manner as to prohibit the rotation of the nut therein is integrally formed on an external side of the supportingly holding portion of the connecting member.

Preferably, a locking pawl is formed in the connecting portion which is adapted to be locked in a locking hole formed in the reinforce.

In a connecting structure for connecting a radiator and a condenser according to the present invention, the radiator and the condenser are connected to each other by fittingly inserting the spacer portion of the connecting member into the reinforce by meshing the folded portion of the reinforce situated on the side of the condenser in the notch, then fittingly inserting the bracket into the notch on the side thereof facing the supportingly holding portion, thereafter allowing the bolt to be put through the reinforce, the spacer portion, the bracket and the supportingly holding portion, and screwing the nut onto the tip of the bolt for clamping the radiator and the condenser together.

Preferably, the radiator and the condenser are connected to each other by fittingly inserting the spacer portion of the connecting member into the reinforce by fittingly meshing the folded portion of the reinforce situated on the side thereof facing the condenser in the notch, then fittingly inserting the bracket into the recessed portion of the supportingly holding portion, thereafter allowing the bolt to be put through the reinforce, the spacer portion, the supportingly holding portion and the bracket and screwing the nut onto the tip of the bolt for clamping the radiator and the condenser together.

Preferably, the nut receiving portion for receiving a nut in such a manner as to prohibit the rotation of the nut therein is integrally formed on the external side of the supportingly holding portion of the connecting member.

Preferably, when the spacer portion of the connecting member is fittingly inserted into the reinforce, the locking pawl of the connecting member is locked in the locking hole formed in the reinforce.

Features and advantages of the invention will be evident from the following detailed description of the preferred embodiments described in conjunction with the attached drawings.

DETAILED DESCRIPTION OF THE PREFERRED EMBODIMENTS

Referring to the accompanying drawings, modes of operation of the present invention will be described in detail below.

Figure 1:
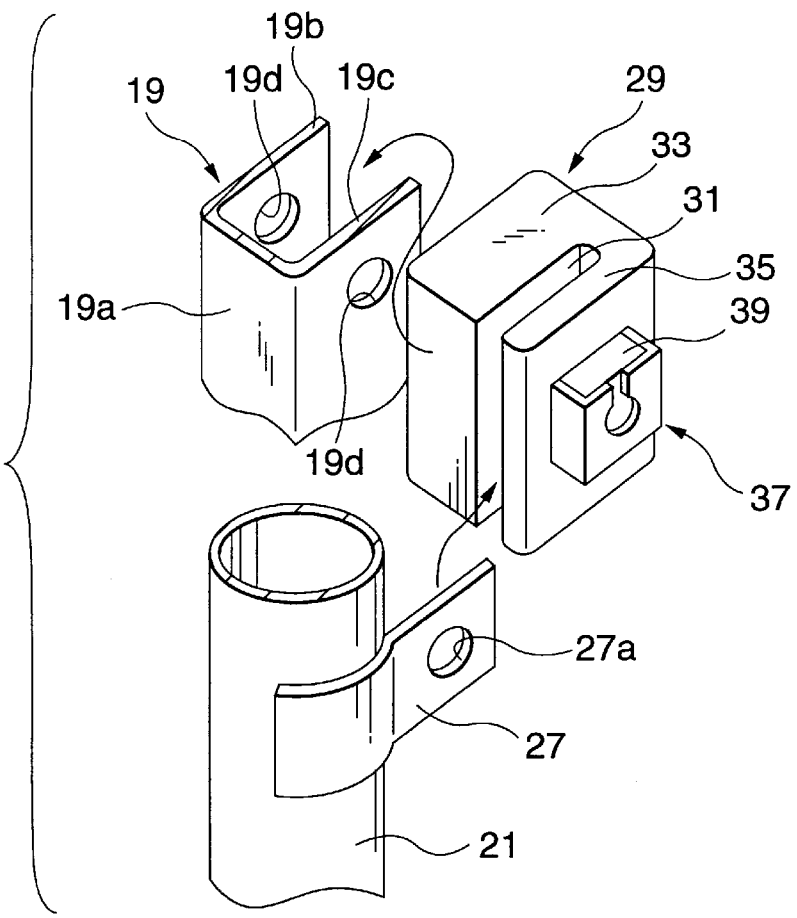
FIG. 1 is an exploded perspective view showing a main part of a connecting structure for connecting a radiator and a condenser according to a first embodiment of the present invention.
Figure 2:
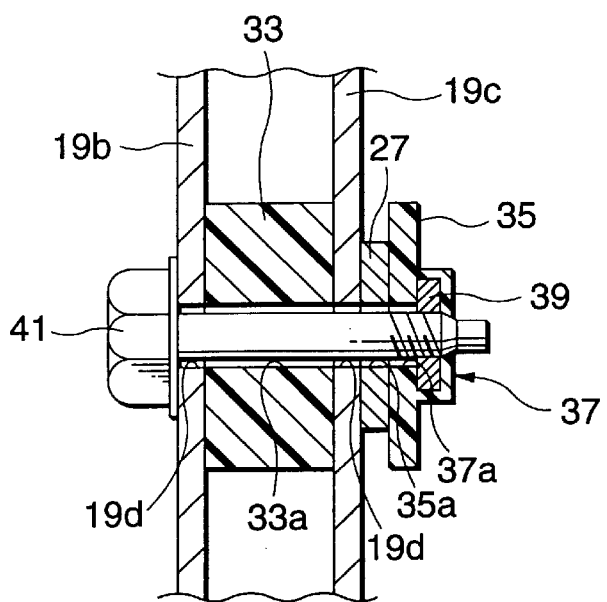
FIG. 2 is a sectional view showing a connected state of FIG. 1.
Figure 3:
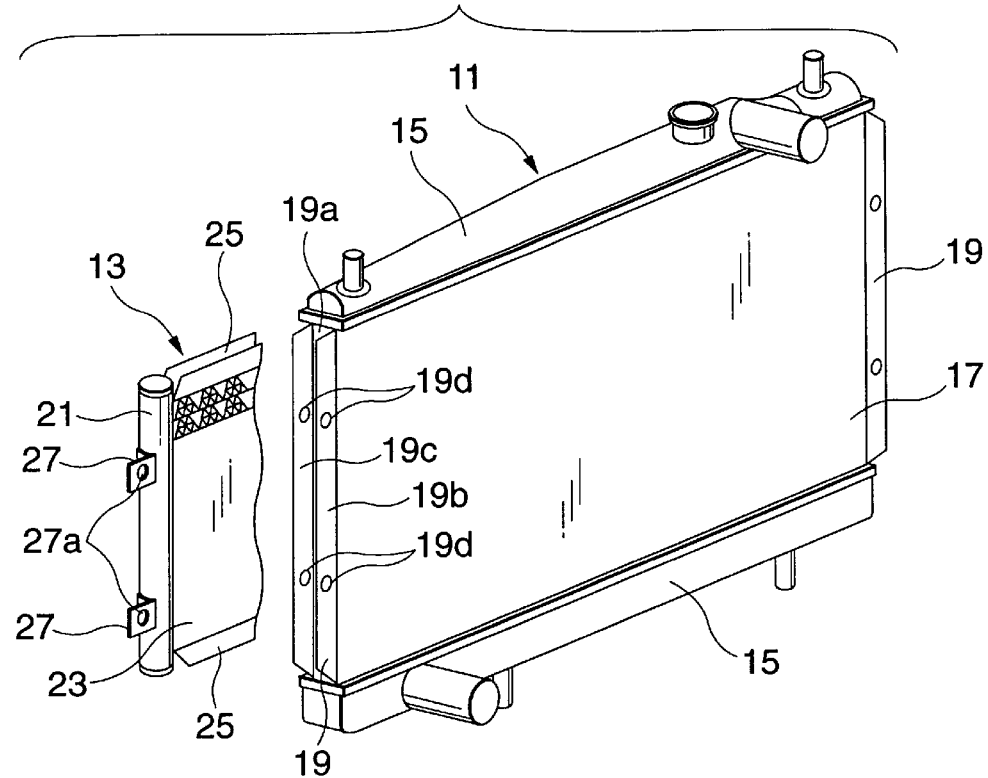
FIG. 3 is a perspective view showing a radiator and a condenser to which the first embodiment is applied.

FIGS. 1 and 2 show a connecting structure for connecting a radiator and a condenser according to a first embodiment of the present invention, and FIG. 3 shows a radiator and a condenser that are to be connected to each other according to the first embodiment.

In FIG. 3, reference numeral 11 denotes a radiator and reference numeral 13 denotes a condenser.

The radiator 11 comprises a core 17 disposed between upper and a lower tanks 15, and a reinforce 19 is disposed on both left- and right-hand sides of the core 17.

The reinforce 19 has a U-shaped cross-section, and folded portions 19b, 19c are extended from both ends of a bottom portion 19a, respectively and parallel from each other.

In addition, bolt holes 19d are formed in upper and lower portions of the folded portions 19b, 19c of the reinforce 19.

The condenser 13 comprises a core 23 disposed between left and right header tanks 21, and reinforcement members 25 are disposed on and underneath the core 23.

The header tank 21 is formed into a cylindrical shape, and brackets 27 are disposed at upper and lower portions of the header tank 21.

Bolt holes 27a are formed in the brackets 27.

FIGS. 1 and 2 show in detail a main part of the connecting structure for connecting a radiator and a condenser according to the present invention, and reference numeral 29 denotes a connecting member for connecting the bracket 27 of the condenser 13 to the reinforce 19 of the radiator 11.

This connecting member 29 is formed into a rectangular parallelpiped and formed of resin such as nylon 66 or the like.

A notch 31 is formed in the connecting member 29, and a spacer portion 33 is integrally formed on one side of the notch 31, while a supportingly holding portion 35 is formed on the other side thereof.

In addition, the spacer portion 33 is fittingly inserted into between the folded portions 19b, 19c of the reinforce 19, and the folded portion 19c of the reinforce 19 on the side thereof facing,the condenser 13 is inserted in the notch 31.

Moreover, the bracket 27 of the condenser 13 is fittingly inserted into the notch 31 in such a manner as to be situated adjacent to the folded portion 19c of the reinforce once set in place.

A rectangular nut receiving portion 37 is integrally formed on an external side of the supportingly holding portion 35 of the connecting member 29.

An opening is formed in this nut receiving portion 37 and a square nut 39 is received therein in such a manner as to be prohibited from rotating.

Bolt holes 33a, 35a, 37a are formed through the spacer portion 33, supportingly holding portion 35 and nut receiving portion 37 of the connecting member 29, respectively, and a female threaded portion of the nut 39 is positioned coaxially with the positions of those bolt holes 33a, 35a, 37a.

Then, a bolt 41 is put through the folded portion 19c of the reinforce 19, the spacer portion 33, the other folded portion 19c of the reinforce 19, the bracket 27 and the supportingly holding portion 35, and the nut 39 is then screwed onto a tip of the bolt 41, whereby the bracket 27 of the condenser 13 is connected to the reinforce 19 via the connecting member 29.

In the aforesaid connecting structure for connecting a radiator and a condenser, the spacer portion 33 of the connecting member 29 is fittingly inserted into the reinforce 19 by inserting the folded portion 19c of the reinforce 19 on the side thereof facing the condenser 13 into the notch 31, the bracket 27 is then fittingly inserted into the notch 31 on the side thereof facing the supportingly holding portion 35, then the bolt 41 is put through the reinforce 19, the spacer portion 33, the bracket 27 and the supportingly holding portion 35, and thereafter the nut 39 is screwed onto the tip of the bolt 41 for connection of the radiator 11 and the condenser 13. Thus, with this construction, the condenser 13 can easily be connected to the reinforce 19 of the radiator 11.

In addition, since the spacer portion 33 of the connecting member 29 is constructed so as to be fittingly inserted into the reinforce 19, there is eliminated a risk of the folded portions 19b, 19c of the reinforce 19 being deformed, this enabling a sufficient connecting strength to be obtained, whereby the condenser 13 can securely be connected to the reinforce 19 of the radiator 11.

Moreover, since the nut receiving portion 37 for receiving a nut therein in such a manner as to prohibit the nut from rotating is formed on the external side of the supportingly holding portion of the connecting member 29, the bolt 41 may simply be rotated for easily screwing the nut 39 after the bolt 41 is put through the reinforce 19, the spacer portion 33, the bracket 27 and the supportingly holding portion 35.

Figure 4:
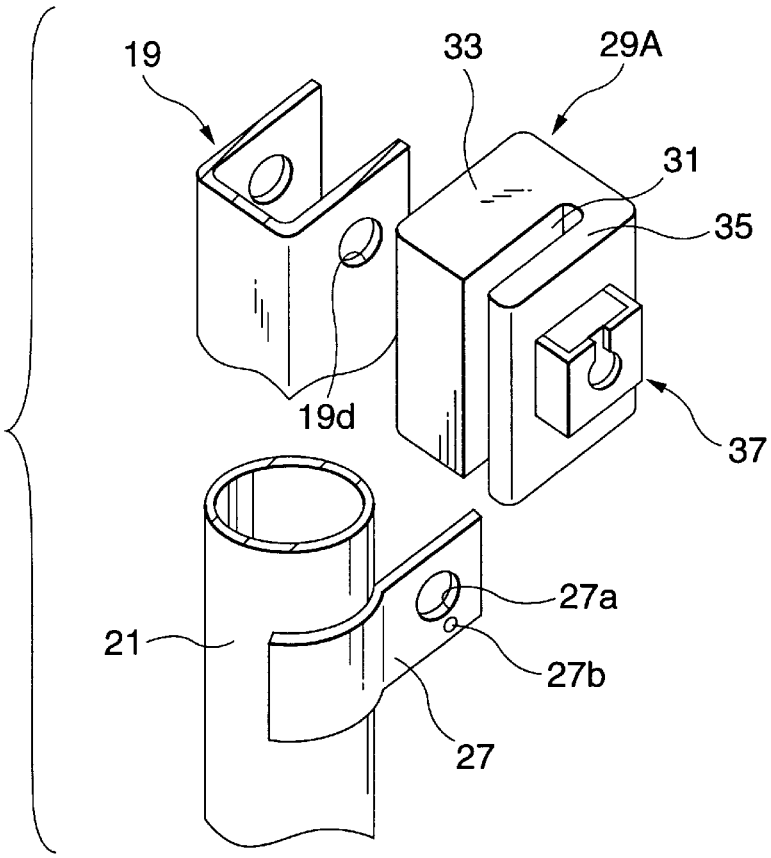
FIG. 4 is an exploded perspective view showing a main part of a connecting structure for connecting a radiator and a condenser according to a second embodiment of the present invention.
Figure 5:
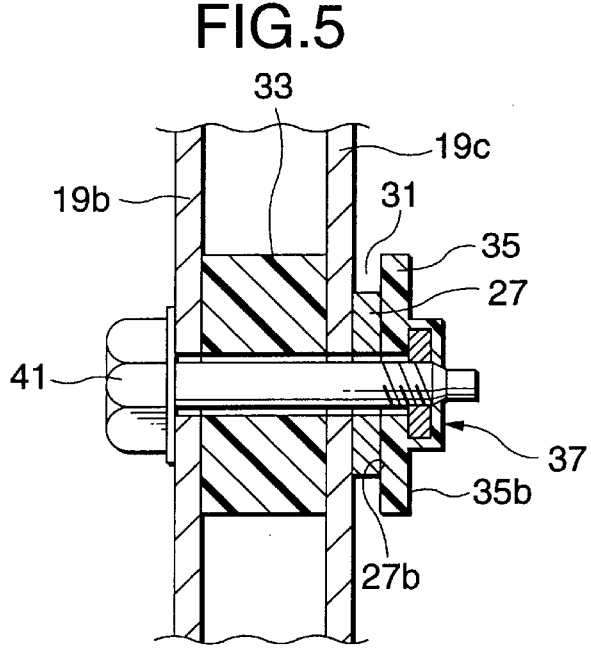
FIG. 5 is a sectional view showing a connected state of FIG. 4.

FIGS. 4 and 5 show a main part of a connecting structure for connecting a radiator and a condenser according to a second embodiment of the present invention. In this embodiment, a projection 27b is formed below a bolt hole 27a formed in a bracket 27 of a condenser 13.

On the other hand, a recessed portion 35b is formed in an internal side of a supportingly holding portion 35 of a connecting member 29A.

In this embodiment, when the bracket 27 of the condenser 13 is fittingly inserted into a notch 31 of the connecting member 29A, the supportingly holding portion 35 is elastically deformed, and the projection 27 on the bracket 27 is fitted in the recessed portion 35b of the supportingly holding portion 35 of the connecting member 29A.

Thus, the bracket 27 can easily and securely be located at a predetermined position in the notch 31 of the connecting member 29A.

Figure 6:
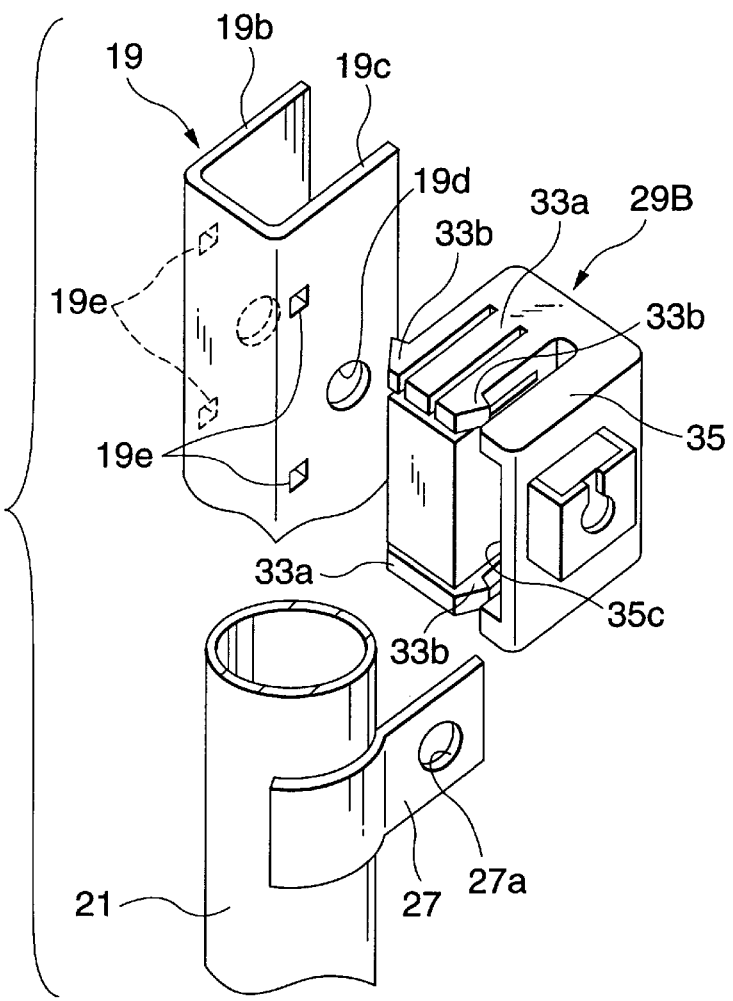
FIG. 6 is an exploded perspective view showing a main part of a connecting structure for connecting a radiator and a condenser according to a third embodiment of the present invention.
Figure 7:
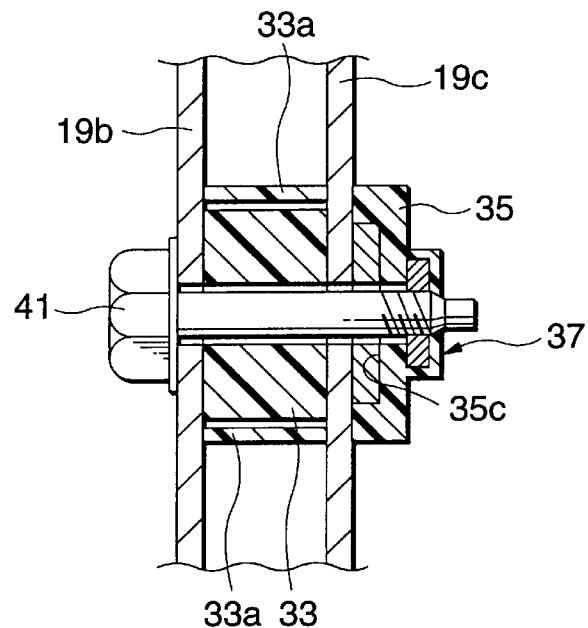
FIG. 7 is a sectional view showing a connected state of FIG. 6.

FIGS. 6 and 7 show a main part of a connecting structure for connecting a radiator and a condenser according to a third embodiment of the present invention.

In this third embodiment, locking holes 19e are formed in folded portions 19b, 19c of a reinforce 19 a predetermined distance above and below a bolt hole 19d.

On the other hand, locking portions 33a are formed in a connecting member 29B at upper and lower portions of a spacer portion 33.

Locking pawls 33b are formed on sides of the locking portion 33a.

In this construction, when the spacer portion 33 of the connecting member 29B is fittingly inserted into the reinorce 19, the locking pawls 33b of the spacer portion 33 are positioned in the locking holes 19e formed in the reinforce 19 for fixation therein.

In addition, in this embodiment, a recessed portion 35c is formed in an internal side of a supportingly holding portion 35 of the connecting member 29B so that a bracket 27 of a condenser 13 is fittingly inserted thereinto.

In this embodiment, when the spacer portion 33 of the connecting member 29B is fittingly inserted into the reinforce 19, the locking pawls 33b of the connecting member 29B are locked in the locking holes 19e formed in the reinforce 19, and therefore the connecting member 29B can easily and securely be disposed at a predetermined position on the reinforce 19.

Moreover, the recessed portion 35c is formed in the internal side of the supportingly holding portion 35 of the connecting member 29B, and therefore the bracket 27 can easily and securely be disposed at a predetermined position.

Figure 8:
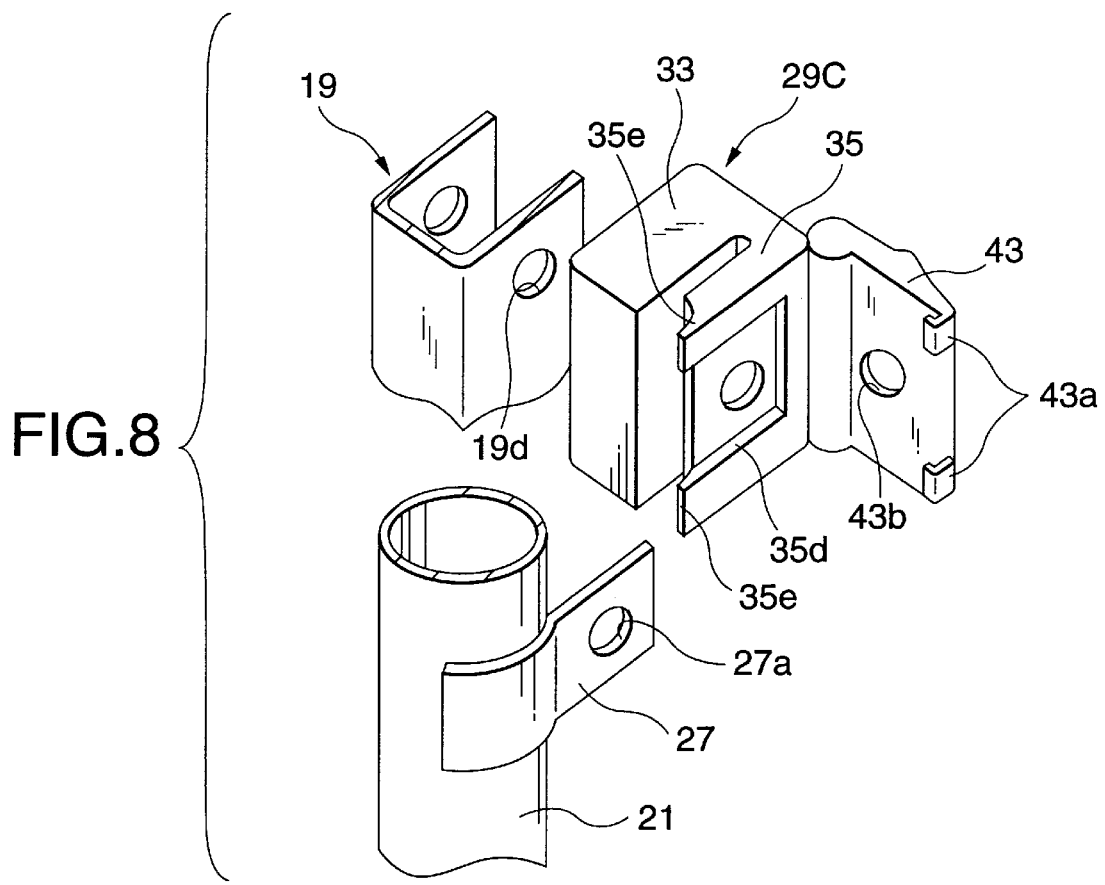
FIG. 8 is an exploded perspective view showing a main part of a connecting structure for connecting a radiator and a condenser according to a fourth embodiment of the present invention.
Figure 9:
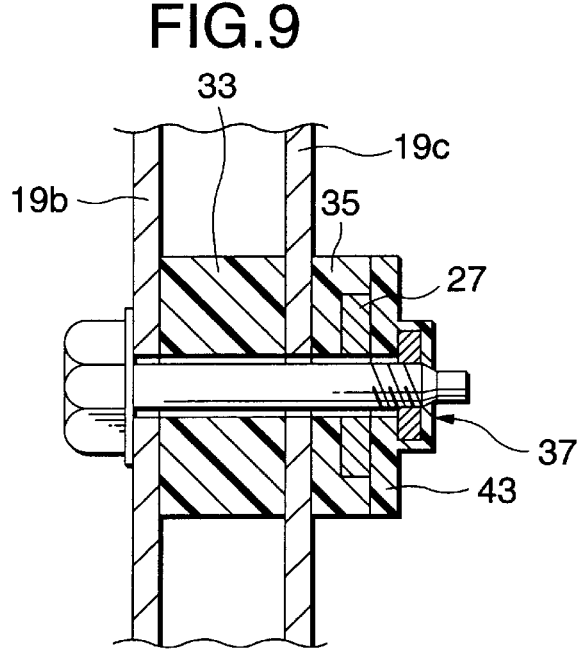
FIG. 9 is a sectional view showing a connected state of FIG. 8.

FIGS. 8 and 9 show a main part of a connecting structure for connecting a radiator and a condenser according to a fourth embodiment of the present invention, and in this embodiment, a recessed portion 35d is formed in an external side of a supportingly holding portion 35 of a connecting member 29C so that a bracket 27 of a condenser 13 can be fittingly inserted thereinto.

In addition, a clip portion 43 is integrally formed on this supportingly holding portion 35 in such a manner as to freely be opened and/or closed.

Locking pawls 43a are integrally formed at the tip of the clip portion 43 which are adapted to be locked on projections 35e of the supportingly holding portion 35.

In addition, a bolt hole 43b is formed in the clip portion 43 and a nut receiving portion 37 is formed on an external side of the clip portion 43.

With this embodiment, an effect similar to that obtained by the first embodiment can also be obtained, and in this embodiment, the bracket 27 of the condenser 13 that is to be fittingly inserted into the supportingly holding portion 35 of the connecting member 29C can temporarily be fixed by allowing the locking pawls 43a of the clip portion 43 to lock onto the projections 35e of the supportingly holding portion 35.

Figure 10:
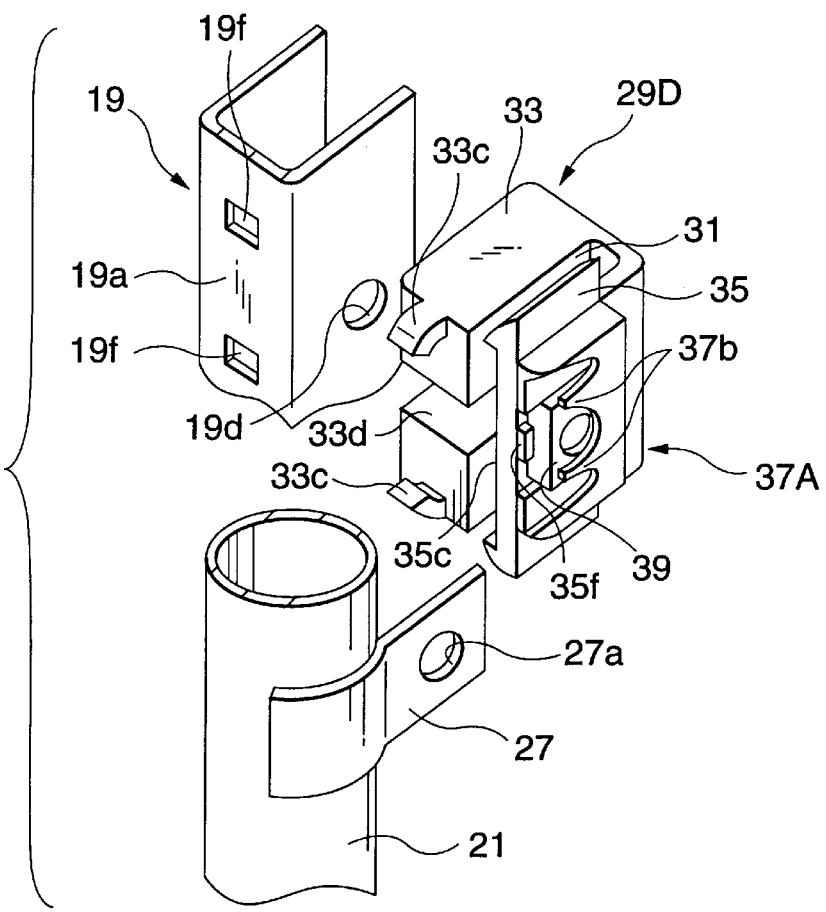
FIG. 10 is an exploded perspective view showing a main part of a connecting structure for connecting a radiator and a condenser according to a fifth embodiment of the present invention.
Figure 11:
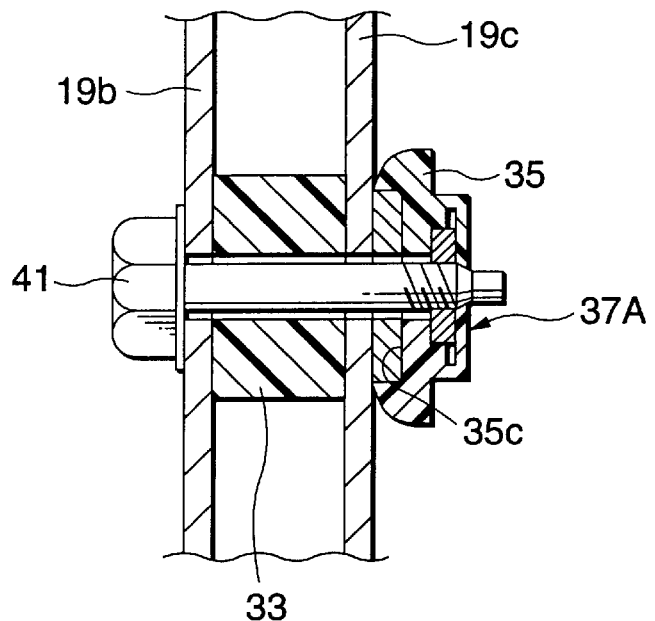
FIG. 11 is a sectional view showing a connected state of FIG. 10.
Figure 12:
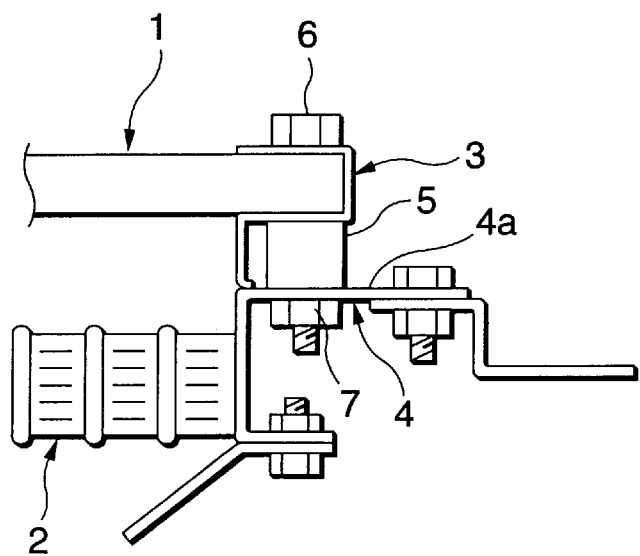
FIG. 12 is a sectional view showing a connected state of a conventional radiator and condenser.

FIGS. 10 and 11 show a main part of a connecting structure for connecting a radiator and a condenser according to a fifth embodiment of the present invention.

In this embodiment, locking holes 19f are formed in a bottom portion 19a of a reinforce 19 a predetermined distance above and below a bolt hole 19d.

On the other hand, locking pawls 33c are formed at upper and lower portions of a spacer portion 33 of a connecting member 29D.

In this construction, when the spacer portion 33 of the connecting member 29D is fittingly inserted into the reinforce 19, the locking pawls 33c of the spacer portion 33 are locked and positioned in the locking holes 19f formed in the reinforce 19 for fixation therein.

Furthermore, in this embodiment, a recessed portion 35c is formed in an internal side of the supportingly holding portion 35 of the connecting member 29D for fitting insertion of the bracket 27 of the condenser 13.

Moreover, in this fifth embodiment, a projection 35f is formed in a nut receiving portion 37A which is adapted to prevent a nut 39 from coming thereoff.

On the other hand, a pair of pawl portions 37b are formed in the nut receiving portion 37, and when the nut 39 is inserted into the nut receiving portion 37A from the side along the projection 35f, the pawl portions 37b are elastically deformed, this allowing the nut 39 to be received inside the projection 35f.

In addition, in this embodiment, there is formed no bolt hole in the spacer portion 33, but instead, a notch 33d is formed through which a bolt 41 is put.

With this embodiment, when the spacer portion 33 of the connecting member 29D is fittingly inserted into the reinforce 19, since the locking pawls 33c are locked in the locking holes 19f formed in the reinforce 19, the connecting member 29D can easily and securely be located at a predetermined position.

Moreover, since the recessed portion 35c is formed in the internal side of the supportingly holding portion 35 of the connecting member 29D for fitting insertion thereinto of the bracket 27 of the condenser 13, the bracket 27 can easily and securely be located at a predetermined position.

Furthermore, in this fifth embodiment, since the projection 35f is formed in the nut receiving portion 37A for preventing the nut 39 from coming thereoff, it is possible to securely prevent the nut 39 from coming out of the nut receiving portion 37A during transportation or the like.

In the aforesaid embodiments, the bolt hole 27a is formed in the bracket 27, but the present invention is not limited to those examples. Instead of the bolt hole, for instance, a notched groove may be formed in the bracket.

As has been described heretofore, with the connecting structure for connecting a radiator and a condenser according to the present invention, the spacer portion of the connecting member is fittingly inserted into the reinforce by inserting the folded portion of the reinforce on the side of the condenser into the notch, then, the bracket is fittingly inserted into the notch on its side facing the supportingly holding portion, thereafter the bolt is put through the reinforce, the spacer portion, the bracket and the supportingly holding portion, and the nut is screwed onto the tip of the bolt for clamping the radiator and the condenser together, whereby the condenser can easily be connected to the reinforce of the radiator.

In addition, since the spacer portion of the connecting member is constructed so as to be fittingly inserted into the reinforce, there is eliminated a risk of the folded portions of the reinforce being deformed, this permitting a sufficient connecting strength to be obtained, whereby the condenser can now easily and securely be connected to the reinforce of the radiator.

If the nut receiving portion is integrally formed in the external side of the supportingly holding portion of the connecting member which nut receiving portion receives a nut in such a manner as to prohibit the nut from rotating, the bolt may simply be rotated for screwing onto the nut after the bolt is put through the reinforce, the spacer portion, the bracket and the supportingly holding portion.

If the locking pawls of the connecting member are locked in the locking holes formed in the reinforce when the spacer portion of the connecting member is fittingly inserted into the reinforce, the connecting member can easily and securely be located on the reinforce at predetermined position thereof.

Although the invention has been described in its preferred form with a certain degree of particularity, it is understood that the present disclosure of the preferred form can be d arrangement of parts without departing from the spirit and the scope of the invention as hereinafter claimed.

What is claimed is:

1. A connecting structure for connecting a radiator and a condenser, comprising:
    a bracket fixed to a tank of the condenser;
    a reinforcement member having a U-shaped cross section comprising a base portion disposed on a side of a core of the radiator and two generally parallel leg members extending outwardly from the base portion;
    a connecting member comprising:
        a spacer portion to be inserted into the reinforcement member;
        a holding portion being integrally formed with said spacer portion; and
        a notch being formed between said spacer portion and said holding portion,
    wherein one of the leg members of said reinforcement member and said bracket are inserted into said notch; and
    a clamping member for clamping said reinforcement member, said spacer portion, said bracket and said holding portion together, thereby connecting the radiator and the condenser;
    wherein a locking pawl is formed in said connecting member, and said locking pawl being adapted to be locked in a locking hole formed in said reinforcement member.

2. A connecting structure for connecting a radiator and a condenser according to claim 1, wherein said clamping member comprises:
    a bolt penetrating through said reinforcement member, said spacer portion, said bracket and said holding portion;
    a nut being screwed onto a tip of said bolt.

3. A connecting structure for connecting a radiator and a condenser according to claim 2, further comprising a nut receiving portion being disposed on an external side of said holding portion of said connecting member so as to receive said nut to prohibit rotation of said nut.

4. A connecting structure for connecting a radiator and a condenser, comprising:
    a bracket fixed to a tank of the condenser;
    a reinforcement member having a generally U-shaped cross section comprising a base portion attached to a side of a core of a radiator and two generally parallel leg members extending outwardly from the base portion;
    a connecting member comprising
        a spacer portion to be inserted into the U-shaped reinforcement member and having a shape that substantially fills the U-shaped cross-section;
        a holding portion being integrally formed with said spacer portion; and
        a notch formed between said spacer portion and said holding portion, wherein one of the leg members is inserted into the notch; and
    a clamping member for clamping the reinforcement member, the spacer portion, the bracket and the holding portion together, thereby connecting the radiator and the condenser.

5. The connecting structure of claim 4, wherein the bracket is inserted into the notch.

6. The connecting structure of claim 4, further comprising a recessed portion formed in the holding portion, wherein the bracket is inserted into the recessed portion.

7. The connecting structure of claim 6, wherein the recessed portion is adjacent the notch.

8. The connecting structure of claim 6, wherein the recessed portion is separated from the notch by a layer of the holding portion.

9. The connecting structure of claim 4, wherein the connecting member further comprises a locking pawl adapted to be locked in a locking hole formed in the reinforcement member.

10. The connecting structure of claim 4, wherein the connecting member comprises a synthetic resin.

11. The connecting member of claim 10, wherein the synthetic resin comprises nylon.

12. The connecting member of claim 4, wherein the reinforcement member extends along a radiator core essentially completely between two radiator tanks.

13. The connecting member of claim 4, wherein the connecting member is block shaped.

14. The connecting member of claim 4, wherein the connecting member comprises a generally U-shaped block.

15. The connecting member of claim 4, wherein the connecting member is generally in the shape of a rectangular parallelpiped.

16. The connecting member of claim 9, wherein the locking hole is formed in one of the legs of the reinforcement member.

17. The connecting member of claim 16, further comprising a second locking pawl adapted to be locked in a second locking hole formed in the other leg of the reinforcement member.

18. The connecting member of claim 9, wherein the locking pawl extends into the notch.

19. The connecting structure of claim 9, wherein the holding portion further comprises a clip portion adapted to cover a recessed portion formed on said holding portion.

20. The connecting structure of claim 19, wherein the clip portion comprises a locking pawl adapted to engage a projection on the holding portion.

21. The connecting structure of claim 19, wherein the clip portion is pivotally attached to the holding portion so that the clip portion may move from a first position adjacent the recessed portion wherein the clip portion is generally aligned parallel to the leg of the reinforcement member inserted in the notch to a second position away from the recessed portion wherein the clip portion extends generally perpendicular to the leg of the reinforcement member inserted in the notch.

22. The connecting structure of claim 21, wherein the clip portion includes a locking pawl that engages a projection on the holding portion to lock the clip portion in place when the clip portion is in the first position.

23. The connecting structure of claim 9, wherein the locking hole is in the base portion of the U-shaped reinforcement member.

24. The connecting structure of claim 4, wherein the spacer portion comprises a second notch.

25. The connecting structure of claim 24, wherein the open end of the second notch is on the same side of the connecting member as the notch.

* * * * *